United States Patent Office 3,221,026
Patented Nov. 30, 1965

3,221,026
SALTS OF 1,1-DICYANO-2,2,2-TRIALKOXY-
ETHANES
Owen W. Webster, Wilmington, Del., assignor to E. I. du
Pont de Nemours and Company, Wilmington, Del., a
corporation of Delaware
No Drawing. Filed Feb. 13, 1962, Ser. No. 172,875
12 Claims. (Cl. 260—340.9)

This invention relates to salts of polycyano compounds, and more particularly, to salts of polycyanopolyalkoxyethanes and a process for their preparation.

The salts are derivatives of tetracyanoethylene which is a very reactive compound that has received considerable study during the last few years. A large number of new and valuable compounds have been prepared from it, and now a new class of polycyano compounds is provided by the present invention.

The novel compounds of this invention are salts of the formula

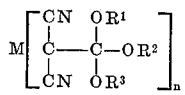

wherein M is a cation, $n$ is the valence of the cation M, $R^1$, $R^2$, and $R^3$ are alkyl of 1–8 carbon atoms or $R^2$ and $R^3$ taken together can be an alkylene radical of 2–6 carbon atoms.

The cation M in the products of this invention can be the ion of any metal, the ammonium ion, or an alkyl substituted ammonium ion in which each alkyl group contains from one through four carbon atoms. The metals, according to the Periodic Table in Deming's "General Chemistry," 5th edition, chapter 11, John Wiley & Sons, Inc., and in Lange's "Handbook of Chemistry," 9th edition, pp. 56–57, Handbook Publishers, Inc. (1956), are the elements of Groups I, II, VIII, III–B, IV–B, V–B, VI–B, VII–B, and the elements of Groups III–A, IV–A, V–A and VI–A which have atomic numbers above 5, 14, 33 and 52, respectively. These metals include both light and heavy metals. The light metals are also known as the alkali metals and the alkaline earth metals. The heavy metals include brittle, ductile and low melting metals as described in the above-mentioned Periodic Table in Lange's Handbook of Chemistry. Thus, the light metals include lithium, sodium, potassium, rubidium, cesium, beryllium, magnesium, calcium, strontium, and barium; and the heavy metals include copper, silver, zinc, cadmium, mercury, iron, cobalt, nickel, titanium, vanadium, chromium and manganese. The ammonium and alkyl substituted ammonium cations include ammonium, dimethylammonium, tetramethylammonium, ethylammonium, tetrabutylammonium, trimethylbutylammonium, and the like.

The salts of this invention in which the cation is an alkali metal ion can be prepared directly by reaction of tetracyanoethylene with three molar equivalents of a metal alkoxide of the formula $M'OR^1$, wherein $M'$ is an alkali metal, e.g., lithium, sodium, potassium, rubidium or cesium, and $R^1$ is an alkyl radical of 1–8 carbon atoms, at a temperature below 10° C. and preferably at a temperature between 0 and −80° C. An excess of the alcohol from which the alkali metal alkoxide is derived is preferably included in the reaction mixture. It is also preferable that the reaction medium should be anhydrous in order to avoid undesired side reactions.

The alkali metal salts of this invention can also be prepared by reaction of a dicyanoketene acetal of the formula

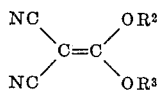

wherein $R^2$ and $R^3$ have the meanings defined above in the general formula for the products of this invention, with one molar equivalent of an alkali metal alkoxide of an alcohol having 1–8 carbon atoms at a temperature below 10° C., and preferably at a temperature between 0 and −80° C., in the presence of an inert reaction medium, e.g., an excess of the alcohol from which the alkoxide is derived, or an ether such as diethyl ether, dioxane, tetrahydrofuran, ethylene glycol dimethyl ether and the like. As in the case of the reaction starting with tetracyanoethylene, the reaction mixture in this case should also be anhydrous to obtain the best results.

While the reaction between the alkali metal alkoxide and the tetracyanoethylene or dicyanoketene acetal takes place in the stoichiometric proportions discussed above, i.e., 3 moles of alkoxide to 1 mole of tetracyanoethylene or 1 mole of alkoxide per mole of dicyanoketene acetal, it is generally preferred to use a small excess of the alkoxide, e.g., a 10–20% excess, to obtain the best results.

The reaction of the alkali metal alkoxide with tetracyanoethylene or with the dicyanoketene acetal takes place at ordinary pressures; however, superatmospheric or subatmospheric pressures can be employed, if desired. At the temperature of reaction, defined above, the reaction is completed in periods of time ranging from one to several hours, e.g., 1–5 hours.

In a modification of this reaction that is useful when alkali metal methoxides are employed as reactants, there can be used a methanolic solution of an alkali metal cyanide in place of a methanolic solution of alkali metal methoxide. Thus, potassium 1,1-dicyano-2,2,2-trimethoxyethanide can be prepared by the reaction of tetracyanoethylene with a molar equivalent of potassium cyanide dissolved in excess methanol at a temperature below 10° C. Apparently, potassium methoxide is formed from the reaction of potassium cyanide with methanol and this in turn reacts with the tetracyanoethylene as described hereinbefore.

The salts of this invention which are less soluble than the alkali metal salts can be prepared from the alkali metal salts by double decomposition. Thus, the addition of an aqueous solution of soluble alkali metal salt of the dicyanotrialkoxyethane anion to an aqueous solution of a water-soluble salt of that metal or alkyl substituted ammonium cation whose dicyanotrialkoxyethane salt is desired results in the precipitation of the desired salt from the reaction mixture. For example, when an aqueous solution of potassium dicyanotrimethoxyethanide is mixed with an aqueous solution of silver nitrate, the less soluble silver dicyanotrimethoxyethanide precipitates from the reaction mixture. The precipitated salt is then filtered from the reaction mixture and dried. By this method salts of dicyanotrialkoxyethanes with metals such as magnesium, calcium, barium, copper, silver, zinc, cadmium, mercury, titanium, vanadium, chromium, iron, cobalt and nickel, and from highly substituted ammonium cations such as tetrabutylammonium, can be prepared from the more water soluble alkali metal salts.

Alternatively, the salts of this invention which are more soluble in water than barium sulfate can be prepared by reacting an aqueous solution of a barium 1,1-dicyano- 2,2,2-trialkoxyethanide with an aqueous solution of the sulfate of a desired cation. In such a reaction, barium sulfate precipitates quantitatively as a byproduct which is readily filtered off, leaving a solution of the salt of the cation which was introduced in the form of a sulfate. In this manner the ammonium and tetramethylammonium, for example, salts of 1,1-dicyano-2,2,2-trialkoxyethanides can be obtained.

The tetracyanoethylene used in the process of this invention can be prepared by known methods; for example, by heating sulfur monochloride with malononitrile, suitably in the presence of an inert liquid diluent. The dicyanoketene acetal used as starting material in the alternative process can be made by heating tetracyanoethylene with an alcohol or a glycol at a temperature between room temperature and 200° C. and preferably at a temperature between 50° and the B.P. of the alcohol or the glycol, optionally in the presence of a catalyst such as a tertiary amine, urea or a metal salt. The preparation of dicyanoketene acetals is described in greater detail in U.S. Patent 2,980,698 to Heckert and Middleton, and by Middleton and Engelhart in J. Am. Chem. Soc., 80, 2788 (1958).

The products and process of this invention are illustrated in further detail by the following examples in which the proportions of ingredients are expressed in parts by weight unless otherwise stated.

EXAMPLE I

*Preparation of potassium 1,1-dicyano-2,2,2-trimethoxyethanide from tetracyanoethylene and potassium methoxide*

A solution of 22 g. of potassium hydroxide in 300 ml. of methanol is prepared and cooled to −80° C. under an atmosphere of nitrogen. To this solution is added a solution of 17 g. of tetracyanoethylene in 100 ml. of tetrahydrofuran over the course of 2 hours with the reaction mixture maintained at −80° C. The solution is then allowed to warm to room temperature and is evaporated to dryness. The residue is extracted with a solution of 500 ml. of acetonitrile and 75 ml. of methanol. Evaporation of the extract gives 18 g. of crude potassium 1,1-dicyano-2,2,2-trimethoxyethanide which is identified by its infrared absorption spectrum.

EXAMPLE II

*Preparation of potassium 1,1-dicyano-2,2,2-trimethoxyethanide from dicyanoketent dimethyl acetal and potassium methoxide*

One gram of potassium metal is added to 100 ml. of absolute methanol cooled to −80° C. by means of a mixture of solid carbon dioxide and acetone. The potassium dissolves vigorously in a few minutes to form a solution of potassium methoxide. To this cold solution is added 3.77 g. of dicyanoketene dimethyl acetal (prepared by the method described by W. J. Middleton and V. A. Engelhardt in J. Am. Chem Soc., 80, 2793 (1958)). The solution is stirred while warming to room temperature over a period of 1 hour. The methanol is then evaporated and the residue is recrystallized from a mixture of acetonitrile and methanol. There is obtained 3.9 g. of potassium 1,1-dicyano-2,2,2-trimethoxyethanide which is identified by its infrared absorption spectrum.

EXAMPLE III

*Preparation of sodium 1,1-dicyano-2,2,2-trimethoxyethanide from tetracyanoethylene and sodium methoxide*

A solution of 6.9 g. of sodium in 150 ml. of methanol is cooled to −40° C. in a mixture of solid carbon dioxide and acetone. To the cold solution is added a solution of 6.4 g. of tetracyanoethylene in 40 ml. of anhydrous tetrahydrofuran dropwise over 1 hour at −40° C. Each drop turns a deep purple color which is soon discharged. Stirring is continued for an additional 2 hours at −40° C. The solution is then added to 500 ml. of dry diethyl ether and refrigerated overnight. Filtration of the reaction mixture gives 4.8 g. (48% of theory) of an off-white, water-soluble solid identified as sodium 1,1-dicyano-2,2,2-trimethoxyethanide by infrared analysis.

EXAMPLE IV

*Sodium 1,1-dicyano-2,2,2-triethoxyethanide from 1,1-dicyanoketene diethyl acetal and sodium ethoxide*

To a solution of 1.6 g. of sodium metal in 100 ml. of absolute ethanol cooled to 0° C. by means of an ice bath is added dropwise over 3 hours a solution of 1.5 g. of dicyanoketene diethyl acetal in 50 ml. of absolute ethanol. The mixture is then added to 500 ml. of dry diethyl ether. The mixture is chilled to −10° C. and filtered. There is obtained 4.02 g. (68% of theory) of slightly yellow, water-soluble crystals of sodium 1,1-dicyano-2,2,2-triethoxyethanide. After recrystallization from acetonitrile, the compound decomposes at temperature above 250° C.

*Analysis.*—Calcd. for $C_{10}H_{15}N_2O_3Na$: C, 57.27%; H, 6.45%; N, 11.96%. Found: C, 57.40%; H, 6.61%; N, 12.15%.

EXAMPLE V

*Preparation of sodium 1,1-dicyano-2-ethoxy-2,2-ethylenedioxyethanide from dicyanoketene ethylene acetal and sodium ethoxide*

The procedure of Example IV is repeated using 1.6 g. of sodium, 75 ml. of absolute ethanol and 6.8 g. of dicyanoketene ethylene acetal (alternately named 2-dicyanomethylene-1,3-dioxolane, and prepared as described in U.S. Patent 2,980,698). There is obtained 8.36 g. (82%) of an off-white, solid sodium 1,1-dicyano-2-ethoxy-2,2-ethylenedioxyethanide. The product decomposes above 250° C., after recrystallization from acetonitrile.

*Analysis.*—Calcd. for $C_8H_9N_2O_3Na$: C, 47.06%; H, 4.45%; N, 13.72%. Found: C, 47.45%; H, 4.15%; N, 14.18%.

EXAMPLE VI

*Preparation of potassium 1,1-dicyano-2,2,2-trimethoxyethanide from tetracyanoethylene and potassium cyanide in methanol*

To a solution of 1.24 g. of potassium cyanide dissolved in 60 ml. of methanol at −80° C. under an atmosphere of nitrogen is added a solution of 2.50 g. of tetracyanoethylene in 50 ml. of methanol over the course of 3 hours. The solution is then warmed to −20° C. and held at this temperature for 2 hours. On addition of 300 ml. of diethyl ether, 2.4 g. of white, crystalline potassium 1,1-dicyano-2,2,2-trimethoxyethanide precipitates. This product is collected on a filter and dried. An analytical sample is prepared by recrystallization three times from acetonitrile.

*Analysis.*—Calcd. for $C_7H_9N_2O_3K$: C, 40.36%; H, 4.32%; N, 14.45%. Found: C, 40.47%; H, 4.32%; N, 13.76%.

The infrared absorption spectrum of this product shows nitrile bands at 2180 and 2130 cm.$^{-1}$ indicative of the substituted malononitrile anion, as well as strong ether absorption in the 1100 to 1000 cm.$^{-1}$ range.

EXAMPLE VII

*Preparation of cupric 1,1-dicyano-2,2,2-triethoxyethanide from sodium 1,1-dicyano-2,2,2-triethoxyethanide and cupric acetate*

To 2.0 g. of sodium 1,1-dicyano-2,2,2-triethoxyethanide in 50 ml. of warm water is added in one portion a solution of 2.0 g. of cupric acetate monohydrate in 50 ml. of hot water. The solution is refrigerated overnight. Filtration of the cold reaction mixture gives 1.71 g. of intensely green, cubic crystals of cupric 1,1-dicyano-2,2,2-triethoxyethanide, M.P. 230–233° C.

*Analysis.*—Calcd. for $C_{20}H_{30}N_4O_6Cu$: C, 49.42%; H, 6.22%. Found: C, 49.31%; H, 6.01%.

The examples have illustrated the salts of this invention by reference to specific metal salts of certain dicyanotrialkoxyethanes. However, the invention includes any salt of the general formula given hereinbefore. If the procedures of Examples I and III are repeated with substitution of the alkali metal alkoxides listed in the first column of following Table I for the alkoxides of those examples the salts listed in the second column are produced.

TABLE I.—REACTION OF ALKALI METAL ALKOXIDES WITH TETRACYANOETHYLENE

| Alkoxide | Salt |
| --- | --- |
| Lithium butoxide | Lithium 1,1-dicyano-2,2,2-tributoxyethanide. |
| Rubidium isopropoxide | Rubidium 1,1-dicyano-2,2,2-triisopropoxyethanide. |
| Cesium octoxide | Cesium 1,1-dicyano-2,2,2-trioctoxyethanide. |

Likewise, when the procedures of Examples II, IV, and V are repeated with the alkoxides listed in the first column of Table II substituted for the alkoxides of those examples, and the dicyanolketene acetals of the second column are substituted for the acetals of those examples the salts listed in the third column are obtained.

TABLE II.—REACTION OF ALKALI METAL ALKOXIDES WITH DICYANOKETENE ACETALS

| Alkoxide | Dicyanoketene acetal | Dicyanotrialkoxyethanide |
| --- | --- | --- |
| Lithium butoxide | Dicyanoketene dimethyl acetal. | Lithium 1,1-dicyano-2-butoxy-2,2-dimethoxyethanide. |
| Potassium propoxide. | Dicyanoketene hexamethylene acetal. | Potassium 1,1-dicyano-2,2-hexamethylenedioxy-2-propoxyethanide. |
| Cesium methoxide | Dicyanoketene dibutyl acetal. | Cesium 1,1-dicyano-2,2-dibutoxy-2-methoxyethanide. |
| Rubidium ethoxide. | Dicyanoketene dioctyl acetal. | Rubidium 1,1-dicyano-2-ethoxy-2,2-dioctoxyethanide. |
| Sodium methoxide | Dicyanoketene trimethylene acetal. | Sodium 1,1-dicyano-2-methoxy-2,2-trimethylenedioxyethanide. |

Similarly, when the cupric acetate of Example VII is replaced by magnesium nitrate, barium chloride, calcium chloride, aluminum chloride, chromium nitrate, ferric nitrate, cobalt chloride, nickel nitrate, manganese dibromide, silver nitrate, stannous chloride, titanium tetrachloride, vanadium trichloride, or antimony trichloride and the procedure of that example repeated the corresponding magnesium, barium, calcium, chromium, iron, cobalt, nickel, manganese, silver, tin, titanium, vanadium or antimony salts of dicyanotrialkoxyethanides are formed.

The salts of this invention have been found to be particularly useful as propellants. Thus, equivalent weights (about 0.1 g.) of sodium 1,1-dicyano-2,2,2-trimethoxyethanide and potassium perchlorate are ground separately in mullite mortars and then intimately mixed together. The mixture is packed in a cartridge of 1-mil brass foil approximately 2 mm. in diameter and 12 mm. long with one end crimped shut. The cartridge is placed in the lower end of a copper tube of 9 mm. inside diameter and 5 ft. length with the open end of the cartridge at the lower end of the tube. The cartridge is ignited by means of a remotely operated gas burner, and it is propelled about half way up the brass tube. Similar results are obtained when the sodium 1,1-dicyano-2,2,2-trimethoxyethanide is replaced with equivalent weights of sodium 1,1-dicyano-2,2,2-triethoxyethanide and sodium 1,1-dicyano-2-ethoxy-2,2-ethylenedioxyethanide.

The embodiments of the invention in which an exclusive property or privilege is claimed are defined as follows:

1. A compound of claim 7 wherein M is an alkali metal ion and $R^1$, $R^2$ and $R^3$ are each alkyl of 1–8 carbon atoms.
2. Potassium 1,1-dicyano-2,2,2-trimethoxyethanide.
3. Sodium 1,1-dicyano-2,2,2-trimethoxyethanide.
4. Sodium 1,1-dicyano-2,2,2-triethoxyethanide.
5. Sodium 1,1-dicyano-2-ethoxy - 2,2 - ethylenedioxyethanide.
6. Cupric 1,1-dicyano-2,2,2-triethoxyethanide.
7. A compound of the formula

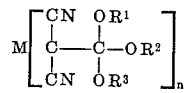

wherein M is a cation selected from the class consisting of metals, ammonium and alkyl substituted ammonium wherein each alkyl group contains 1 through 4 carbon atoms; $R^1$ is alkyl of 1–8 carbon atoms; $R^2$ and $R^3$ are selected from the group consisting of alkyl of 1–8 carbon atoms and, taken together, alkylene of 2–6 carbon atoms, and $n$ is the valence of the cation M.

8. A process for preparing a compound of the formula

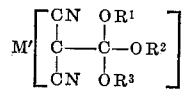

wherein M′ is an alkali metal cation, $R^1$ is alkyl of 1–8 carbon atoms and $R^2$ and $R^3$ are selected from the group consisting of alkyl of 1–8 carbon atoms and, taken together, divalent aliphatic hydrocarbon of 2–6 carbon atoms; which comprises reacting at a temperature below 10° C. an alkali metal alkoxide of the formula $M'OR^1$ wherein M′ and $R^1$ are defined as above with a compound selected from the class consisting of

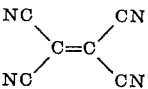

and

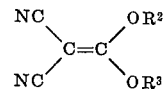

wherein $R^2$ and $R^3$ are defined as above.

9. The process of claim 8 wherein the compound reacted with the alkali metal alkoxide is

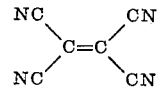

at a ratio of three molar equivalents of the alkali metal alkoxide to the

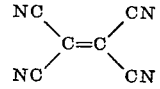

10. The process of claim 8 wherein the compound reacted with the alkali metal alkoxide is

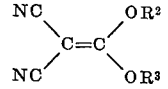

11. The process of claim 8 wherein the $R^1$ of the $M'OR^1$ reactant is a methyl group.

12. The process of claim 11 wherein the $M'OR^1$ is formed prior to addition of the second reactant by adding $M'CN$ to $R^1OH$ wherein M′ and $R^1$ are defined as in claim 11.

References Cited by the Examiner

UNITED STATES PATENTS 2,766,247  10/1956  Middleton _____ 260—465.6

NICHOLAS S. RIZZO, *Primary Examiner.*

WALTER A. MODANCE, *Examiner.*